United States Patent [19]

Sturm et al.

[11] Patent Number: 5,107,268
[45] Date of Patent: Apr. 21, 1992

[54] METHOD OF MULTIPATH TRACK REDUCTION IN AN AIRCRAFT TRACKING SYSTEM

[75] Inventors: Patricia K. Sturm, Phoenix; Lewis R. Motisher, Peoria; Gregory T. Stayton, Glendale, all of Ariz.

[73] Assignee: Honeywell Inc., Minneapolis, Minn.

[21] Appl. No.: 585,325

[22] Filed: Sep. 20, 1990

[51] Int. Cl.$^5$ .................... G01S 13/80; G01S 13/86
[52] U.S. Cl. .................... 342/36; 342/37; 342/32; 342/451; 342/455
[58] Field of Search ............ 342/29, 30, 32, 36, 342/37, 451, 455

[56] References Cited

U.S. PATENT DOCUMENTS

| | | | |
|---|---|---|---|
| 4,789,865 | 12/1988 | Litchford | 342/455 |
| 4,816,833 | 3/1989 | Ferguson et al. | 342/95 |
| 4,970,518 | 11/1990 | Cole, Jr. | 342/37 |

Primary Examiner—John B. Sotomayor
Attorney, Agent, or Firm—A. A. Sapelli; R. W. Jensen; A. Medved

[57] ABSTRACT

In a Traffic Alert and Collision Avoidance System (TCAS), response to interrogations can result in normal, multipath (image), and mixed multipath (potential image) tracks. The method for reducing the number of false tracks includes the steps of selecting a track to be updated from an existing track list. The selected track has the shortest measured range within the highest priority category track. A reply which has not yet been utilized is selected which has parameters which are within predetermined windows of the selected track parameters. (The predetermined windows are equal to or smaller than the windows for lower priority targets.) The selected track is updated using $\alpha\beta\gamma$ range squared filter, and the selected reply is marked as used. After all tracks are updated, the unused replies are tested to generate new tracks. Then all the tracks are examined to insure that predetermined track category criteria are met, otherwise the track is recategorized.

8 Claims, 7 Drawing Sheets

METHOD OF MULTIPATH TRACK REDUCTION IN AN AIRCRAFT TRACKING SYSTEM

RELATED PATENT APPLICATION

The present application is related to U.S. Pat. Application, Ser. No. 07/415,192, entitled "Improved Track Extension for Use with ATCRBS Surveillance Procedures," by K. Ybarra et. al., filed on Sept. 29, 1989 now abandoned, and assigned to Honeywell Inc., the assignee of the present application.

BACKGROUND OF THE INVENTION

The present invention relates to a method of aircraft traffic indication, and more particularly, to a method of inter-aircraft traffic surveillance for analysis to avoid potential collision with other aircraft.

The increased demands placed on the aircraft flight deck as a result of more complex technology, ever increasing aircraft traffic, and increased demands for safety has brought about a requirement for monitoring of aircraft traffic in a vicinity of an aircraft that includes automatic identification of potential threats to the monitoring aircraft As a result, aircraft can have transponders associated therewith that, in response to appropriate electromagnetic interrogation signals provide responding electromagnetic signals that include information with respect to the range, altitude, and bearing of the interrogated aircraft. Certain traffic control system transponders, e.g., the mode-S system, include target identification as part of the information imposed on the responding electromagnetic signals. For these mode-S systems, the identification of the path or track of the responding aircraft is relatively simple, involving time dependent positions and altitudes of an identified aircraft. Similarly, extrapolations or extensions of aircraft tracks can be relatively simple.

In systems (such as the Air Traffic Control Radar Beacon System, ATCRBS) which do not include unique aircraft identification information, the determination of the aircraft tracks is more complicated. The information obtained by periodic interrogation of a multiplicity of unidentified targets, with associated range, altitude and bearing information being provided or determined as a result of the interrogation, can be subjected to well known algorithms to provide a target aircraft track. Once the track is identified, then the extension thereof can be computed to determine if the target aircraft is a threat to the monitoring aircraft.

The track determination is complicated for several reasons generally involving spurious target images. For example, a monitoring aircraft can transmit an interrogation signal to a target aircraft, whereupon a transponder in the target aircraft provides a first response signal (direct reply), the delay between the transmission of the interrogation signal and the reception of the first response signal providing the range information. However, the interrogation signal can result in a second response signal that is reflected from the earth's surface. The second response signal, reflected once from the earth, is generally referred to as a single reflection multipath (or type I) reply. Because the length of time for the travel of the second response signal is longer than for the first response signal, the second response signal can be interpreted as a separate target aircraft at a greater range from the monitoring aircraft. Type I or single reflection multipath also can be generated by an interrogation which reflects off the ground combined with a direct reply. Since the path length is the same as the previous case, the range is the same. Similarly, an interrogation signal can reflect off the surface of the earth, activate the transponder of the target aircraft which provides a response signal that also reflects off the earth's surface. In this instance, since both the interrogation signal and the second response signal are each reflected once from the earth's surface, this reply is referred to as a double reflection multipath (or type II) reply. This response signal will be interpreted by the monitoring aircraft as a target aircraft at an even greater range than indicated by the direct or type I reply. In this situation, a single target aircraft is providing the monitoring aircraft with a plurality of target responses during each interrogation period. Thus, from a single interrogation cycle (consisting of more than one interrogation), up to three responses can be received from a single target aircraft; namely, a direct reply, a type I reply, and a type II reply. These three tracks are referred to as the normal (direct reply) track, and the image tracks (from type I and II multipath replies).

Tracks also can be formed on mixtures of reply types. In particular, tracks can be formed on combinations of single and double reflection replies. Since the normal track is generally very steady with normal replies available in nearly every scan, tracks formed on a combination of normal replies and reflected replies typically are not formed. However, if a track is lost and reformed under multipath conditions, tracks based on combinations of normal and multipath replies could be formed. In addition, established multipath tracks can be updated by replies generated by the other class of multipath, i.e. a type I multipath track could be updated with a type II multipath reply or vice versa. These updated tracks then in many cases are reclassified as non-multipath tracks. It is also possible to update a direct track with a multipath reply if the direct reply is missing. These effects can occur any time multipath exists. However, the effect is most noticeable at ranges, altitudes, and altitude differences where the elevation angle between the monitoring aircraft and the target aircraft are such that all types of replies can be missing. For systems (using r-trackers) which use two replies to initiate a tracking filters, additional tracks can be formed on combinations of direct, type I, and type II replies, or 6 additional tracks, and for systems (using $r^2$-trackers) which require three successive replies from three successive interrogations to initiate a track, 24 additional tracks can be formed on the combination of replies (i.e., in addition to the direct, type I, and type II tracks). These 6 (or 24) additional tracks are referred to as mixed multipath tracks.

False tracks are a distraction to the pilot when displayed Thus, there is a need to reduce the number of false multipath (and mixed multipath) tracks which are formed and displayed by the TCAS systems. The method of the present invention includes novel techniques which prevent false tracks from being established, and multipath and mixed multipath tracks that are initiated are tagged as such until they coast out or are dropped. The method of the present invention for forming and updating tracks including the reduction of multipath tracks is accomplished by identification of image tracks, classification of tracks and transitions between classes of tracks, special handling of various classifications of tracks, and utilizing a novel predetermined track update order. Also, tracking algorithm selection ($r^2$ tracker) helps in reducing false tracks for all intruders.

In existing systems, tracks are updated in increasing range order without any consideration to track classification in determining the update order. Test results indicated that newly formed image tracks could steal replies from long existing normal tracks. This led to two problems—the normal track would either coast or be updated with some other reply, leading to split tracks, and the image track would be updated with a non-image reply, leading to failure of the image criteria and establishment of the track as a normal (non-image) track. The method of the present invention reduces these negative effects by giving the established, normal tracks first review at the data. The method of the present invention updates tracks in range order from shortest range to longest range within a classification, the order of the classification of the method of the present invention being established normal tracks, non-established image tracks, and potential image tracks.

SUMMARY OF THE INVENTION

Thus there is provided by the present invention, a method for reducing false tracks. An aircraft having a Traffic Alert and Collision Avoidance System (TCAS) interrogates all target aircraft in the vicinity of the aircraft in order to determine potentially dangerous situations. The target aircrafts respond to the interrogation with parameter information which can include altitude (range and bearing are derived by the aircraft). The response (or replies) include direct, single reflection, and double reflection replies which result in normal, multipath (image), and mixed multipath (potential image) tracks. The method for reducing the number of false tracks, including potential image tracks, comprises the steps of selecting a track to be updated from an existing track list. The selected track has the shortest measured range within the highest priority category track. A reply which has not yet been utilized is selected which has parameters which are within a predetermined window of the selected track parameters. The selected track is updated using an $\alpha\beta\gamma$-range-squared-filter, and the selected reply is marked as used. After all the tracks are updated, the unused replies are tested to generate new tracks. Then all the tracks are examined to insure that predetermined track category criteria is met, otherwise the track is reclassified.

Accordingly, it is an object of the present invention to provide a method for reducing multipath tracks.

It is another object of the present invention to provide a method for reducing multipath and mixed multipath tracks.

These and other objects of the present invention will become more apparent when taken in conjunction with the following description and attached drawings wherein like characters indicate like parts, and which drawings form a part of the present application.

BRIEF DESCRIPTION OF THE DRAWINGS

FIG. 4, which comprises

DETAILED DESCRIPTION

Figure 1:
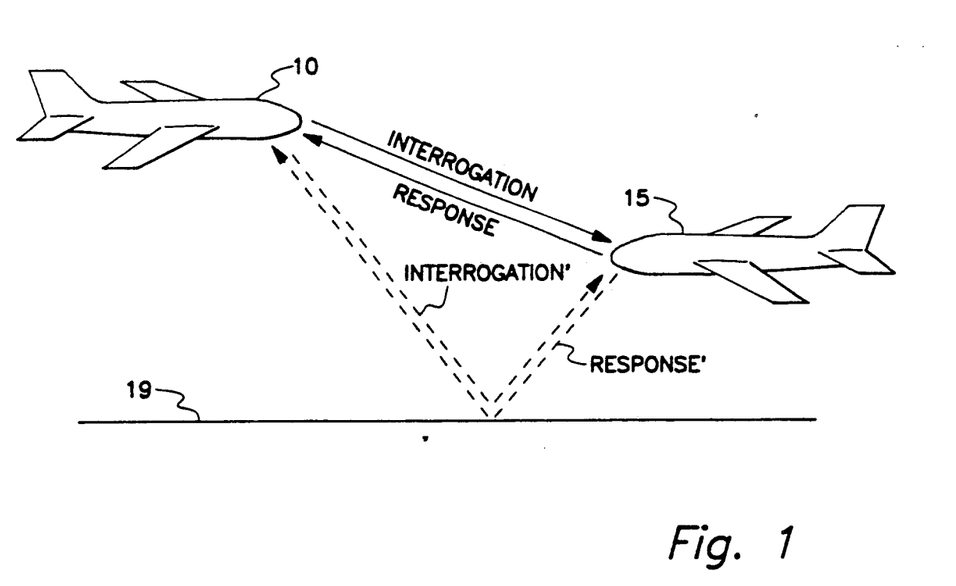
FIG. 1 shows a diagram of possible signal paths for providing multiple target images from a responding single target.

Referring to FIG. 1, there is shown a diagram indicating possible signal paths providing multiple target images for a single target which can occur in the interrogation/response process. A monitoring aircraft 10 can transmit an interrogation (electromagnetic) signal, INTERROGATION, to a target aircraft 15. A transponder (not shown) in target aircraft 15 provides a response signal RESPONSE (a direct reply). (The delay between the transmission of the interrogation signal and the reception of the response signal provides the range information.) However, the interrogation signal INTERROGATION can provide a response signal RESPONSE' that is reflected from the earth's surface 19. The RESPONSE' signal, reflected from the earth is generally referred to as a single bounce (or type I) multipath signal. Because the length of time for the travel of the RESPONSE' signal is longer than for the RESPONSE signal, the RESPONSE' signal can be interpreted as separate target aircraft at a greater range from the monitoring aircraft 10. A second type I multipath can occur whereby an interrogation signal, INTERROGATION', reflects of the surface 19 of the earth which results in the direct reply RESPONSE. The path length of this alternative type I reply is the same as the type I reply discussed previously, so the range of the alternative type I reply is computed to be the same. Lastly, the interrogation signal INTERROGATION' can activate the transponder of the target aircraft 15 and provide the response signal RESPONSE' that reflects off the earth's surface. Because both the INTERROGATION' signal and the RESPONSE' signal are each reflected once from the earth's surface, this signal is referred to as a double bounce (or type II) multipath signal. The RESPONSE' signal which is in response to the INTERROGATION' signal (a type II reply) is interpreted by the monitoring aircraft 10 as a target aircraft at a greater range than indicated by the direct or type I replies. The direct reply is referred to as a normal reply (or normal track) and the type I and type II replies as image replies (or image tracks).

Figure 2:
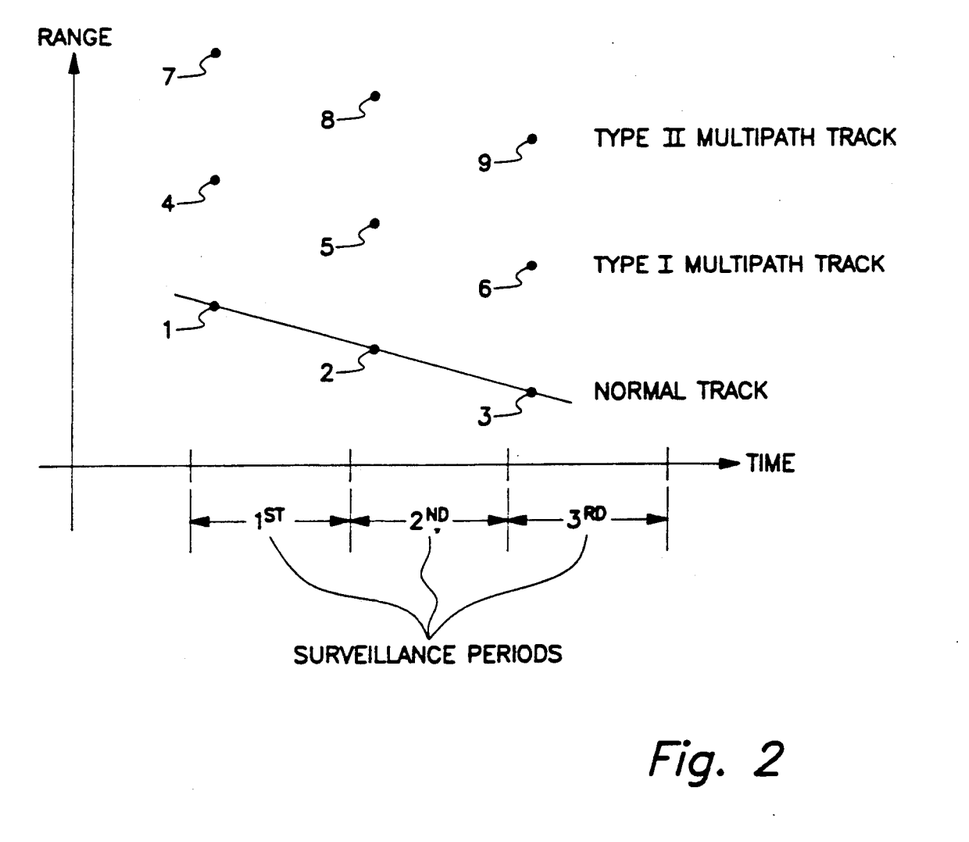
FIG. 2 shows an illustration in which a single target aircraft can provide a plurality of target responses.

Referring to FIG. 2, there is shown an illustration in which a single target aircraft 15 (sometimes referred to herein as intruder 15) can provide the monitoring aircraft 10 with a plurality of target responses during each interrogation period. In the example of FIG. 2, during the first surveillance period, three replies are detected, depicted as points 1, 4, and 7, the replies being direct, type I, and type II replies, respectively. Similarly, during the second and third surveillance period, points 2, 5, 8 and 3, 6, 9 are received respectively. The replies from points 1, 2, 3 are direct replies and are utilized in forming the direct track. Points 4, 5, 6 are type I replies utilized in forming the type I multipath track, and points 7, 8, 9 are type II replies utilized in forming the type II multipath track, the type I and type II tracks being the image tracks.

Tracks are formed from 3 replies in consecutive surveillance periods. If the replies meet predetermined altitude conditions and range linearity conditions a track is formed. A range rate is computed for the track using 2 or 3 of these replies. Typically, if an $\alpha\beta$-tracker is used for tracking range only the first and third points are used to initialize the range rate, points 1 and 3 for the direct replies, points 4 and 6 for the type I replies, and points 7 and 9 for the type II replies. If the track is formed in a multipath environment, then as mentioned above there may be 3 replies each surveillance period from a single intruder, a direct reply, a single reflection reply (type I), and a double reflection reply (type II). However tracks can be formed using replies of mixed types. Since only the first and third points are used to initialize the range rate there can be 6 mixed reply range rates possible. Range rate equations for each of these 6 new tracks have been derived and can be used to identify potential image tracks.

If an $\alpha\beta\gamma$-tracker is used for tracking range, then typically all 3 replies are used to initiate the range rate. (A range acceleration is also computed.) In this case there are 27 possible initial range rates. There is the normal track formed from replies of points 1, 2, 3 and there are single and double reflection image tracks formed from the replies of points 4, 5, 6 and 7, 8, 9, respectively. In addition there are 24 possible mixed range rates formed from the replies of 3 points, the combination of points being as follows—(1,2,6), (1,2,9), (1,5,3), (1,5,6), (1,5,9), (1,8,3), (1,8,6), (1,8,9), (4,2,3), (4,2,6), (4,2,9), (4,5,3), (4,5,9), (4,8,3), (4,8,6), (4,8,9), (7,2,3), (7,2,6), (7,2,9), (7,5,3), (7,5,6), (7,5,9), (7,8,3) and (7,8,6). Range rate equations have been derived for each of the 24 new tracks for both range and range squared trackers and can be used to identify potential image tracks.

The operation of aircraft collision avoidance apparatus is governed by the Radio Technical Commission for Aeronautics (RTCA) Minimum Operation Performance Standard (MOPS) for Traffic Alert and Collision Avoidance System (TCAS) manual document number DO-185. This manual provides detailed minimum standards to be met in track determination, track/target reply correlation, signal processing (e.g., the identification of duplicated replies), etc.

The MOPS manual defines three classifications of tracks—non-established normal track, image track, and established normal track. The preferred embodiment of the present invention adds a new classification (potential image tracks) and splits image tracks into two classifications (established and non-established). Each of these five classes of tracks is described in table 1.

When a track is formed from three replies meeting the initiation criteria, it is classified as one of the following three types—non-established normal, potential image, or non-established image depending upon how the range rate of the new track compares to the range rates of existing tracks. If the range rate of the forming track is within a predetermined tolerance of the type I or type

TABLE 1

| TRACK CLASSIFICATION | |
|---|---|
| Track Classification | Criteria |
| Non-Established Normal | Formed from three replies meeting the initiation criteria, which do not satisfy any of the image equations. No fourth correlating reply has been received. |
| Potential Image | Formed from three replies meeting the initiation criteria, which satisfy the mixed image range rate equations. No fourth correlating reply has been received. |
| Non-Established Image | Formed from three replies meeting the initiation criteria, which satisfy the type I or type II range equations. |

TABLE 1-continued

| TRACK CLASSIFICATION | |
|---|---|
| Track Classification | Criteria |
| | No fourth correlating reply has been received. |
| Established Image | A non-established image track, established by a confirming fourth correlating reply. |
| Established Normal | A non-established normal track, established by a confirming fourth reply. |

II image range of an existing track, it is classified as a non-established image track. If the range rate of the forming track is within a predetermined tolerance of one of the mixed image range rates of an existing track, it is classified as a potential image track. Otherwise, it is classified as a non-established normal track. As will be described in detail hereinunder, potential image tracks are dropped immediately if no updating reply is found or are changed to normal tracks if updating replies are found. Non-established image tracks and non-established normal tracks are retained for future update. If a non-established image track is updated with a fourth correlating reply within a preselected length of time, it is reclassified as an established image track. Similarly, if a non-established normal track is updated with a fourth correlating reply within a specified length of time, it is reclassified as an established normal track. Only established normal tracks are made available to the Collision Avoidance System (CAS) logic for threat determination.

Occasionally, a type I image track is updated with a type II reply, or vice versa. Also an image (type I or type II) track can be updated with a normal reply. Sometimes this can lead to the failure of the image criteria and the reclassification of the track as a normal track. However, some test data has shown that if the requirement for reclassification to a normal track were that the image criteria fail in two consecutive surveillance periods, the number of image tracks being established as normal tracks would be greatly reduced. Thus, the preferred embodiment of the present invention requires at least two consecutive surveillance periods in which the image criteria fail before an image track can be reclassified as a normal track.

It will be recognized by those skilled in the art that a number of target replies can be missing and the track algorithms will continue to retain and provide extensions for the previously identified tracks even in the absence of target replies. After the preselected number of track replies are missing during the periodic interrogation by the monitoring aircraft, the track is no longer considered to be present.

Other spurious replies can be generated, compromising the track generating algorithm. The TCAS system of the preferred embodiment of the system in which the present invention can be found uses a Whisper-Shout mode of interrogation for ATCRBS intruders in which interrogation signals of different amplitude are used to interrogate the target aircraft transponders. Between the threshold of the transponders and the suppression of response when interrogation signals greater than a defined amplitude are received by the transponder, the Whisper-Shout mode provides for assistance in separation of target replies. Further, it will be understood by those skilled in the art that the surveillance period of the preferred embodiment of the system is approximately 1 sec during which time an interrogation sequence is performed for the ATCRBS systems, mode S type interrogations take place, and finally the processing of the replies is performed as discussed hereinunder. The interrogation sequence of the preferred embodiment of the present invention will not be discussed further since it is not necessary to understanding the present invention.

Figure 3:
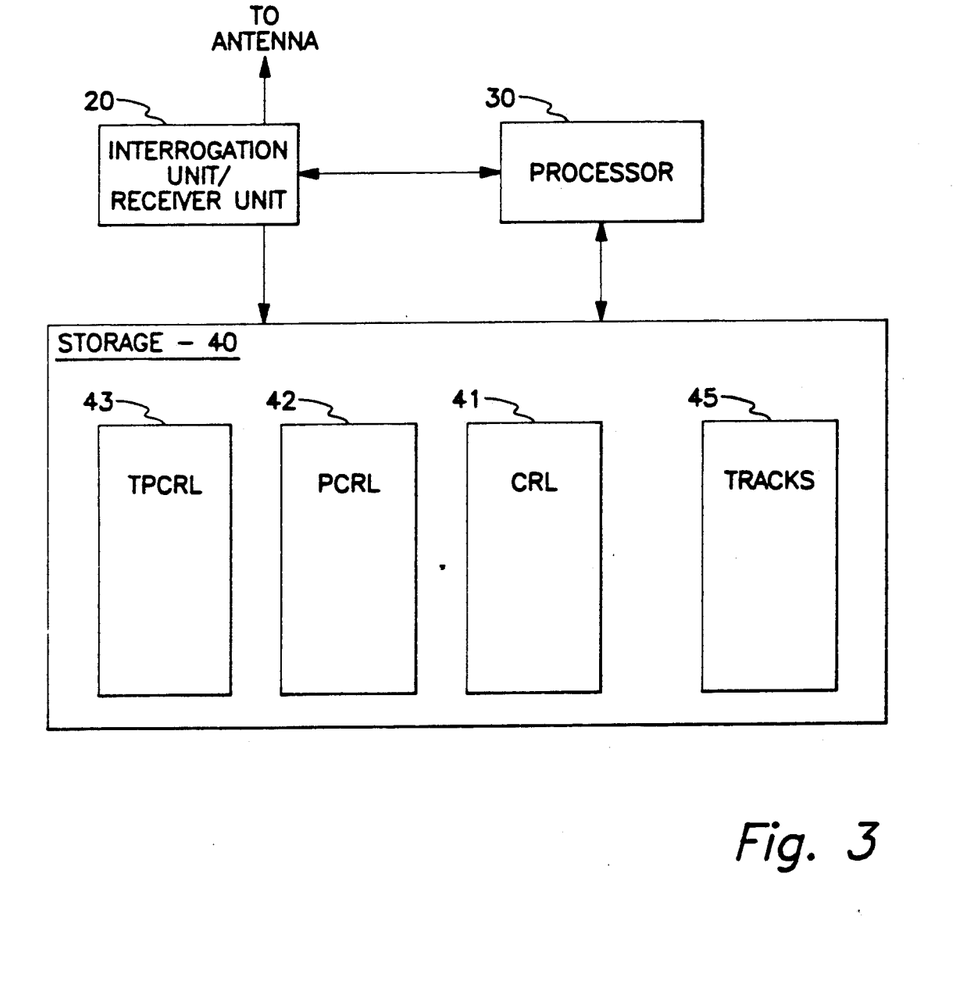
FIG. 3 shows a partial block diagram of a representative system in which the method of the present invention can be utilized.

Referring to FIG. 3, there is shown a block diagram of a representative system in which the method of the present invention can be utilized. An interrogation unit 20 performs a predetermined interrogation sequence transmitting a predetermined pulse sequence, the pulses having varying power values, to a predetermined one of a plurality of antennas. Replies to the interrogations are received and processed by a processor 30. The results are coupled to and saved in a storage unit 40, in particular, the current reply list (CRL) 41. The CRL 41 includes processed data for each reply, which includes range, altitude, bearing,... Part of the preliminary processing includes filtering the raw replies utilizing known techniques such as Raw Reply Elimination. The elimination process utilizes techniques well known, for example if an interrogation transmission is forward and the reply indicates the response is from the rear, this response is discarded (off axis reply) since it will more than likely be duplicated when the interrogation is aft. The storage unit 40 is partitioned to include previous cycle reply lists (PCRL) 42 and a second list, two previous cycle reply lists (TPCRL) 43. These lists can be maintained by any standard technique well known in the art. A list of tracks is maintained in a separate list, tracks 45. Referring to FIG. 4 which comprises figure A through figure D, there is shown a flow diagram of the method of the present invention. After the interrogation sequence of a surveillance period is completed, the reply data is stored in the current reply list 41 and reply elimination is completed, the updating process of targets begins. The next track in the track list is selected to be updated, the first time through the update processing, the next track is the first track. (It will be understood by those skilled in the art that initially pointers, indexes,... are initialized the first time the processing starts in a surveillance period, the method utilized can be any method well known to those skilled in the art and is not critical to an understanding of the method of the present invention, block 801.) The track list is scanned to determine if any established normal track having an age associated therewith of greater than 20 seconds is included in the track list (block 802). The track list 45 continues to be scanned selecting all the established normal tracks older than 20 seconds, in an effort to find the remaining track in this category having the shortest measured range (block 803). There is an advantage of using measured range rather than tracked range (which was done in previous systems). Since false tracks generally have high range rates, projecting ahead the tracked range of the false tracks causes the false tracks to surpass the range of the real tracks such that the false track is updated prior to the real track. It is desirable to update the real tracks first, thereby increasing the chances of the false target coasting out. Using measured range in the present invention effectively gives the real track priority in utilizing the replies of the current reply list 41. Once a reply in the CRL 41 is used to update a track, it is flagged and is not utilized again. The reply list 41 includes measured range, measured altitude, and measured bearing. The track list 45 includes measured and tracked range as well as tracked range rate and all the predictions for the next second, i.e. the next surveillance period. (Measured range is derived from the time difference between the measured time of the transmission of the interrogation and the measured time of the reception of the reply, i.e. the time of travel times the speed of light divided by 2. Tracked range is the smoothed range out of a filter, i.e. where the target is anticipated to be during the current surveillance period.)

Figure 4A:
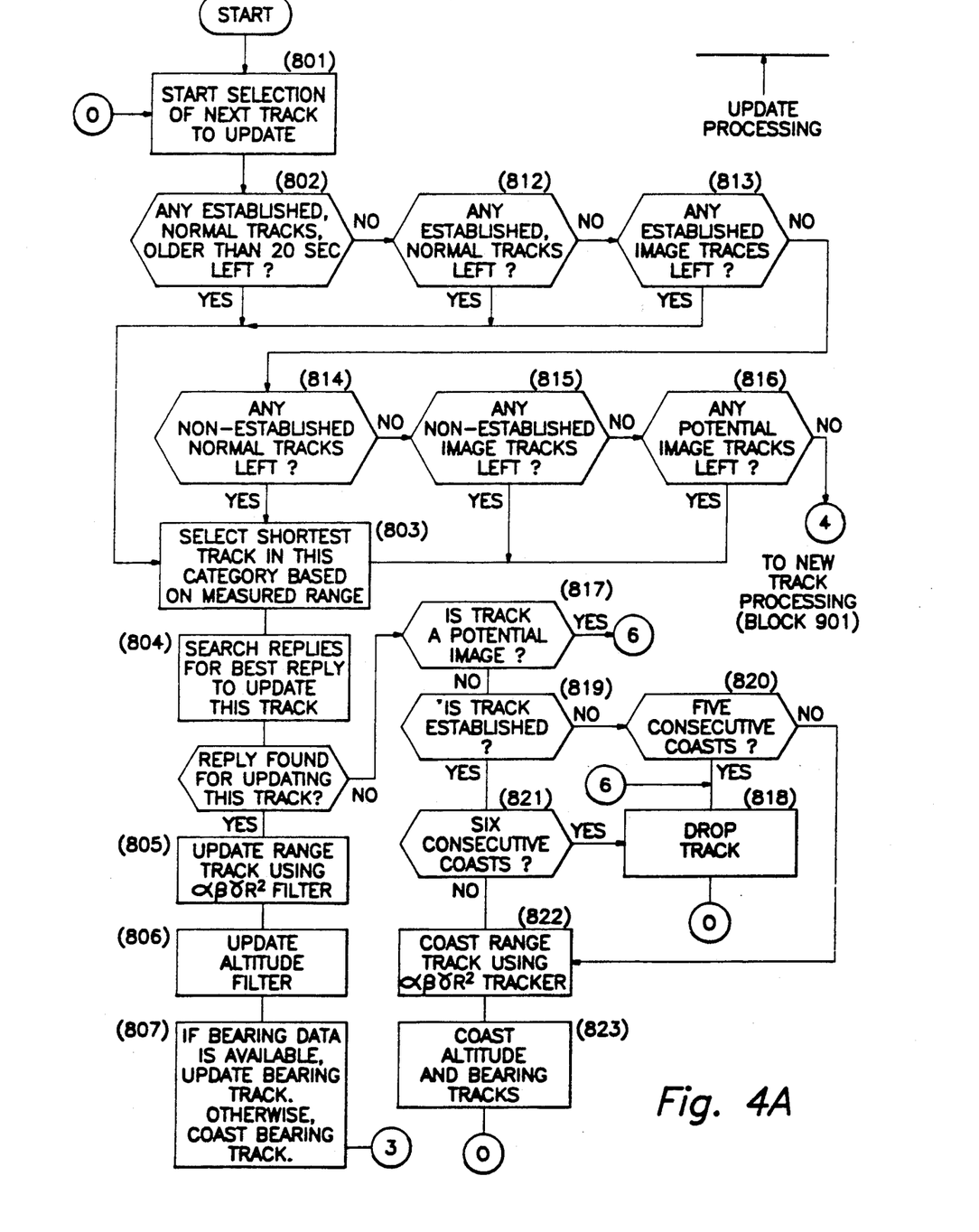
FIGS. 4A through 4D, shows a flow diagram of the method of the present invention.
Figure 4B:
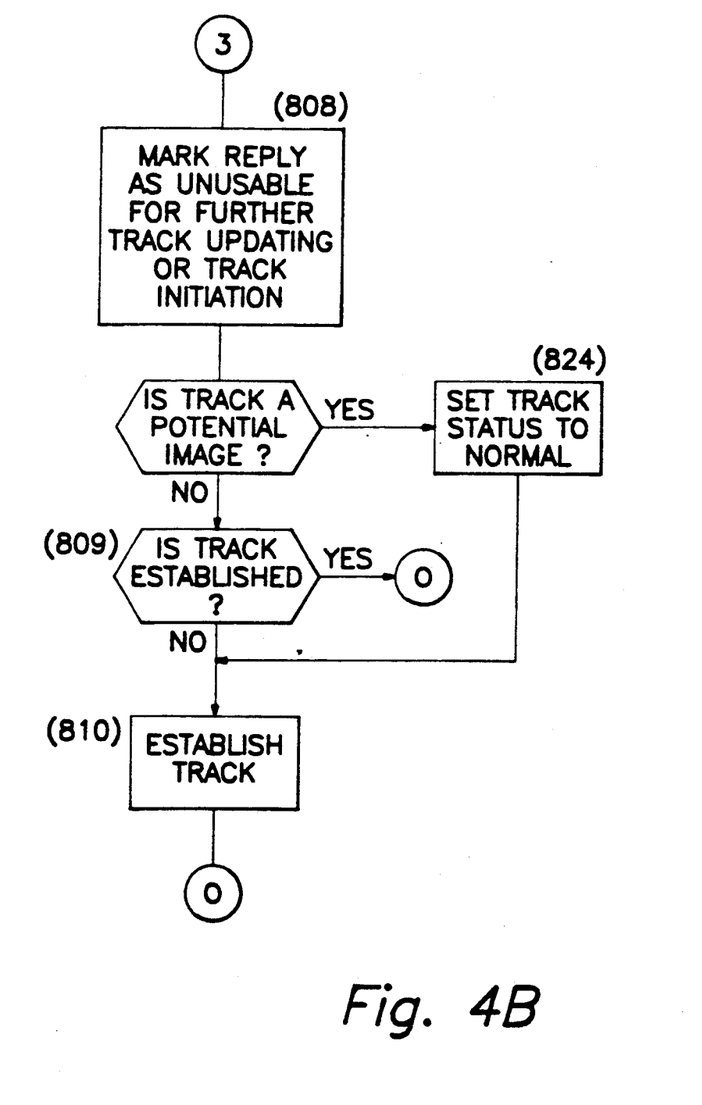

Once the target to be updated is selected, the replies are searched for the best reply to update the track (block 804). A range window and an altitude window are placed around the target and the replies are scanned to find the best reply to update the track. (Again, any known comparison technique known to those skilled in the art can be used.) In some cases bearing information is also utilized. When a reply is found, the track is updated (block 805), the preferred embodiment utilizing an $\alpha\beta\gamma\text{-}r^2$ -filter which results in a smooth value of range. The $\alpha\beta\gamma$ values are stored in the track list 45. Altitude and bearing data if available are also updated (block 806, 807). The data in the CRL 41 which was utilized to update the track being processed, is flagged such that the data is not available for updating other tracks or for initiating any new track (block 808). If the track is classified as an established track (block 809), the next track is selected and the process repeats (block 801). If the track is not established, then the track is classified as an established track (block 810) and the process continues to start the selection of the next track (block 801). After all the established normal tracks having a life greater than 20 seconds have been updated (block 802) the remaining tracks are updated by classification. The update is performed in order as follows; all the established normal tracks are processed next (block 812) then all the established image tracks are processed (block 813), then all the non-established normal tracks are processed (block 814), then all the non-established image tracks are processed (block 815), and finally all the potential image tracks are processed (block 816). As can be readily seen the shortest track within the classification is processed first.

The tracks classified as potential image tracks are those that appear to be formed from mixed multipath replies, thus the confidence level that these are real tracks is low. When searching the reply list for this classification of tracks, smaller windows than for the other classifications are applied in order that if no reply is found these tracks are dropped immediately (block 817, 818). For all the other classifications of tracks other than potential image tracks if a reply is not found for updating the track, the target is coasted 5 or 6 consecutive times depending on whether the track is established or not (blocks 819-823). The process then continues to the next track to be updated (block 801). If the track is a potential image and a reply has been found, the track classification is changed to a normal track (block 824). The coast counter for a target is maintained in the track list 45.

Figure 4C:
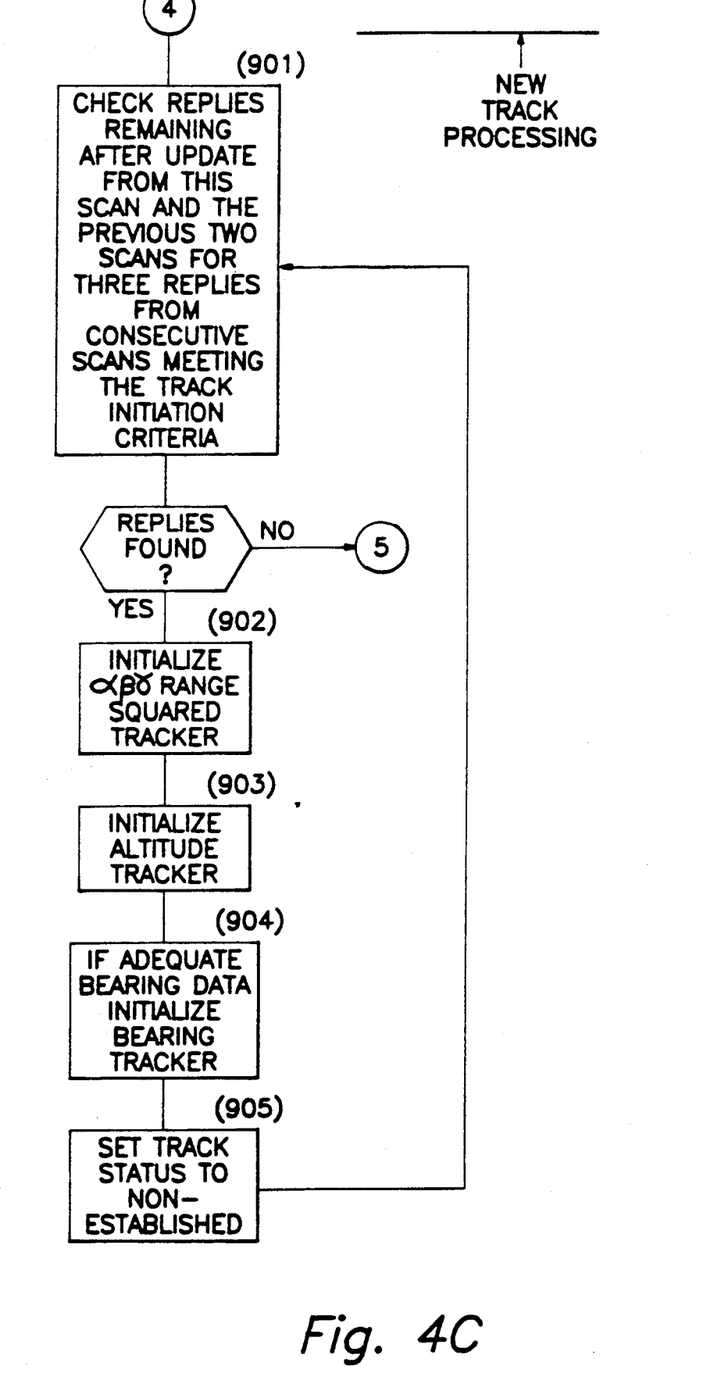

When all the targets are updated (block 816), the process proceeds to the determining new tracks (block 901, FIG. 4C). The CRL 41 is scanned to check for all the replies remaining which have not been utilized. An unused reply from CRL 41 is used to scan for unused replies from the previous cycle reply list (PCRL) 42 and for unused replies in the two previous cycle reply list (TPCRL) 43. The replies from the three consecutive scans must meet predetermined track initiation criteria.

For example altitude reporting replies must have altitudes within 200 feet. If a reply is non-altitude reporting then all three replies must also be non-altitude reporting replies. Linearity criteria in range must also be met (e.g. 312.5 feet of projected range). If replies are found in the three consecutive lists which meet the criteria, then a track is initiated and the track information is passed through the $\alpha\beta\gamma$-$r^2$-tracker initialization (block 902). Also the altitude tracker information must be initialized for altitude reporting intruders (block 903), and if adequate bearing data is available the bearing tracker must be initiated (block 904). The track status is then set to a non-established track (block 905) and the process repeats at block 901 until all the unused replies in CRL 41 have been examined.

Figure 4D:
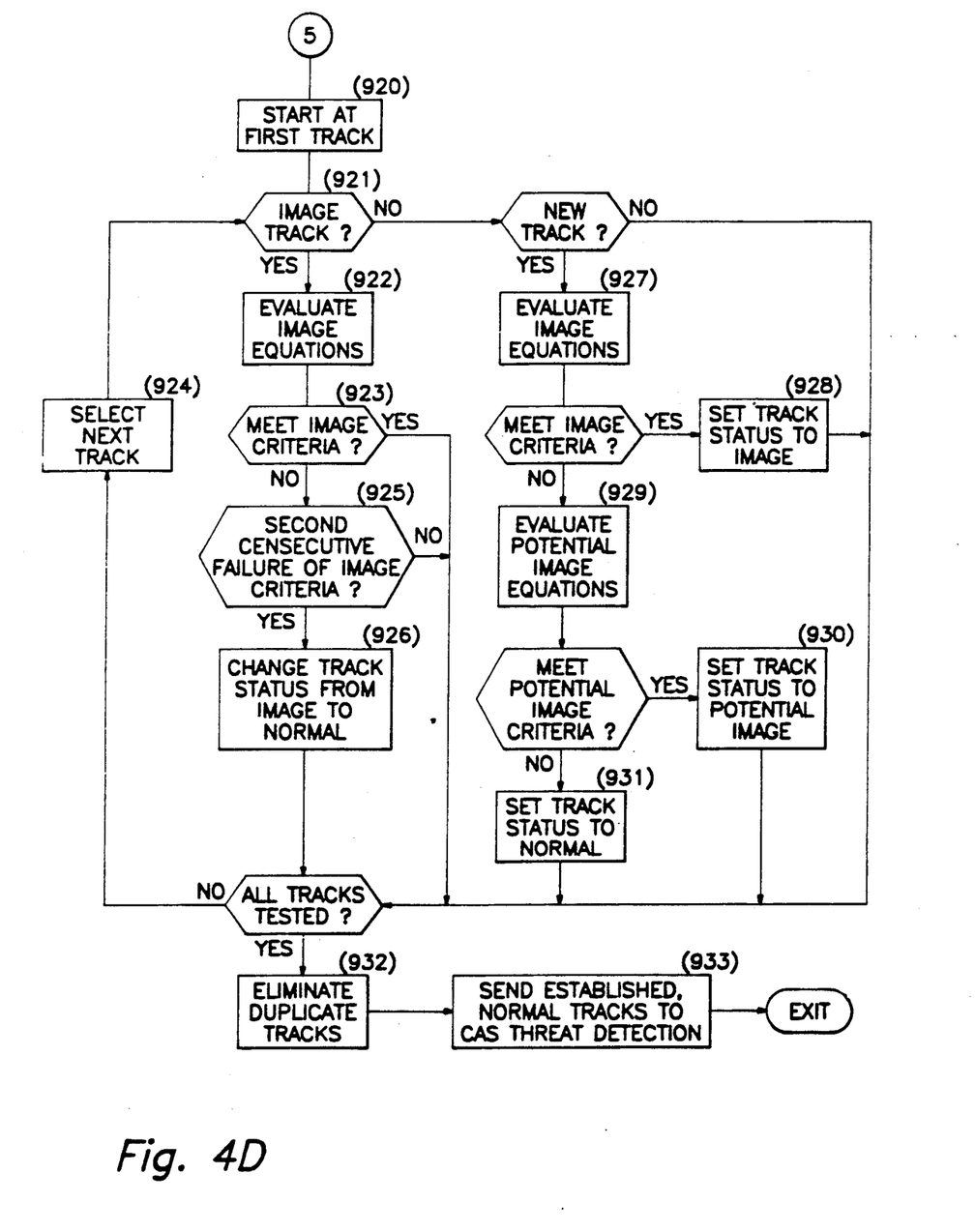

After all the replies in the CRL 41 have been examined, all the tracks in the track list 45 are examined including the newly initiated tracks. This attempts to determine which tracks are image tracks. The process starts with the first track in the list (block 920). If the track is an image track (block 921), the track is applied to the image equations to determine if the track is still an image track (block 922). If the track meets the image criteria, i.e. range rate is within 40 knots of computed range rate, (block 923), the track remains an image track, the next track is selected (block 924), and the process continues (block 921). If the track fails the image criteria two consecutive times (block 925), the track status is changed from image to normal (block 926). All non-image tracks which are not new tracks are ignored, and the next track in the list is processed (block 920). New tracks are evaluated for image criteria (block 927). If the image criteria are met the track status is changed to image status (block 928). If the image criteria are not met, the new track is evaluated to determine if it meets the potential image criteria (block 929), i.e. mixed multipath rate equations. If the track meets the potential image criteria, the track status is set to potential image (block 930). If the potential image criteria are not met, the track status is set to normal (block 931). After all the tracks have been tested, all the duplicate tracks are eliminated, by matching range, range-rate, altitude, bearing.... (block 932). All the established normal tracks are then passed to the collision avoidance system (CAS) threat detection logic (block 933).

The multipath image equations (including the mixed multipath rate equations) are found in Appendix A.

While there has been shown what is considered the preferred embodiment of the present invention, it will be manifest that many changes and modifications can be made therein without departing from the essential spirit and scope of the invention. It is intended, therefore, in the annexed claims, to cover all such changes and modifications which fall within the true scope of the invention.

We claim:

1. In an aircraft having a Traffic Alert and Collision Avoidance System (TCAS) wherein said aircraft interrogates all target aircraft in the vicinity of said aircraft in order to determine potentially dangerous situations, said target aircrafts responding to said interrogation with parameter information which can include altitude, and further wherein said responses (replies) include direct, single reflection, and double reflection replies which result in normal, multipath (image), and mixed multipath (potential image) tracks, a method for reducing the number of false tracks, including potential image tracks, comprising the steps of:

a) selecting a track to be updated from an existing track list, the selected track having the shortest measured range within a highest priority category track;
   b) selecting one of said replies which has not yet been used, the reply having parameters which are within a predetermined window of the selected track parameters;
   c) updating the range track of the selected track using an $\alpha\beta\gamma$-range-squared-filter;
   d) marking the selected reply as used;
   e) if more tracks need to be updated; proceeding to step (a), otherwise, continuing;
   f) checking remaining unused replies to generate new tracks; and
   g) examining all tracks to insure that predetermined category criteria are met; otherwise reclassifying the track.

2. In an aircraft having a Traffic Alert and Collision Avoidance System (TCAS) wherein said aircraft interrogates all target aircraft in the vicinity of said aircraft in order to determine potentially dangerous situations, said target aircrafts responding to said interrogation with parameter information which can include altitude, and further wherein said responses (replies) include direct, single reflection, and double reflection replies which result in normal, multipath (image), and mixed multipath (potential image) tracks, a method for reducing the number of false tracks, including potential image tracks, comprising the steps of:

a) selecting a track to be updated from an existing track list, the track having an nth priority category, n varying from 1 to N starting with n = 1, the track further having the shortest measured range within the nth priority category, and where N is the lowest priority;
   b) selecting one of said replies which has not yet been used, the reply having parameters which are within predetermined windows of the selected track parameters;
   c) if no reply is found and the track is in a potential image category,
      i) dropping the track; otherwise—
      ii) coasting the range track using $\alpha\beta\gamma$ range squared filter, altitude, and bearing tracks; and
      iii) proceeding to step (f);
   d) updating
      i) range track using $\alpha\beta\gamma$ range squared filter;
      ii) altitude track; and
      iii) bearing track;
   e) checking if the track is classified as established—
      i) and if not,
         1) setting the track to an established classification; and
         2) continuing,
      ii) otherwise, continuing; and
   f) selecting the next track to be updated having the next shortest measured range within the nth priority category, and if all the tracks within the nth priority category have been updated,
      i) increasing n to n+1;
      ii) and if n is less than N+1, proceeding to step (a); otherwise
      iii) continuing;
   g) checking remaining unused replies to generate new tracks; and
   h) examining all tracks to verify that the assigned category of the track meets predetermined criteria for that category, and if the predetermined criteria are not met, recategorizing (reclassifying) the track.

3. A method for reducing the number of false tracks according to claim 2, wherein the categories include: established normal tracks, established image tracks, non-established normal tracks, non-established image tracks, and potential image tracks.

4. A method for reducing the number of false tracks according to claim 3, wherein the categories further include:
   established normal tracks older than a predetermined time.

5. A method for reducing the number of false tracks according to claim 4, wherein the category N is the potential image category.

6. A method for reducing the number of false tracks according to claim 2, further comprising the step of:
after the step of updating, marking the selected reply as used, thereby making the selected reply unusable for updating another track or initiating a track during a given surveillance period.

7. A method for reducing the number of false tracks according to claim 6, wherein the predetermined window of the selected track parameter of a lower priority category is equal to or less than the predetermined window of the higher priority categories.

8. A method for reducing the number of false tracks according to claim 7, wherein the step of examining all tracks further comprises the steps of:
for image tracks—
a) evaluating the image criteria;
b) if the image criteria are met, selecting the next track to be examined; otherwise
c) changing the track category to normal upon a predetermined number of consecutive failures of the image criteria, the predetermined number being a fixed number greater than one.

* * * * *